Nov. 20, 1962
W. J. SCAVUZZO
3,064,618
SIGNAL INDICATOR
Filed Sept. 19, 1960
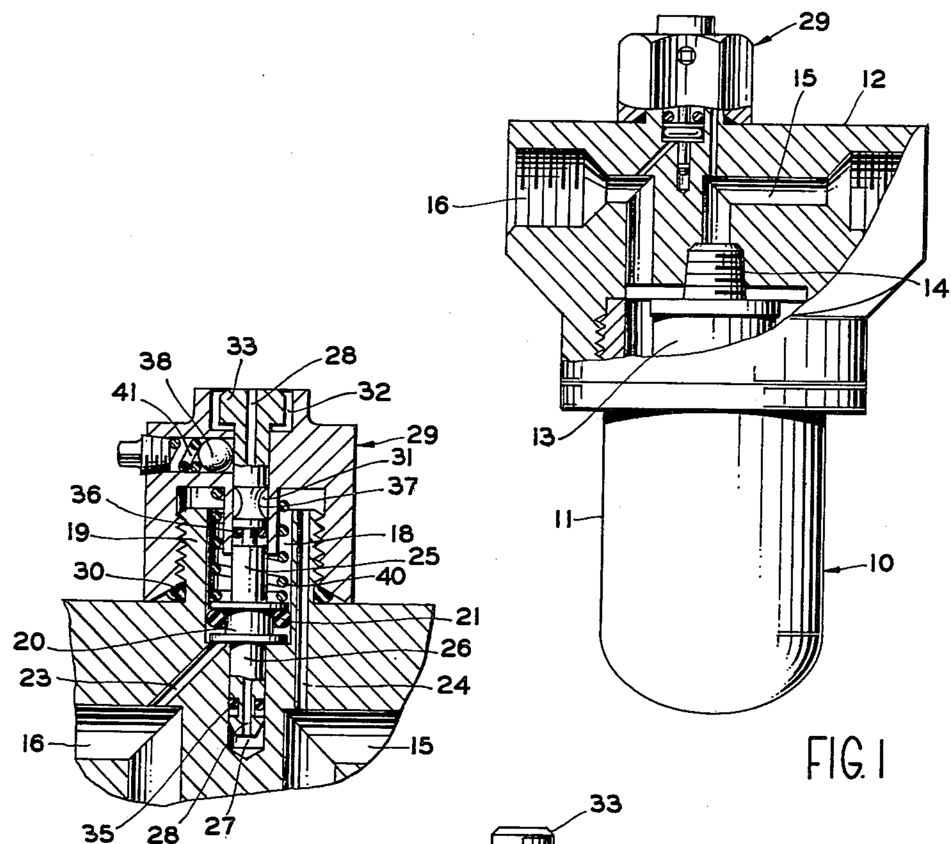
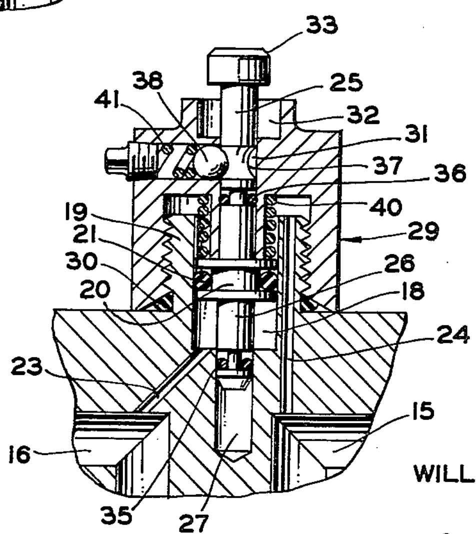
FIG. 3
WILLIAM J. SCAVUZZO
*INVENTOR.*
BY Lawrence J. Winter
ATTORNEY United States Patent Office 3,064,618

Patented Nov. 20, 1962

3,064,618

SIGNAL INDICATOR

William J. Scavuzzo, Clark, N.J., assignor to Purolator Products, Inc., Rahway, N.J., a corporation of Delaware Filed Sept. 19, 1960, Ser. No. 56,967
6 Claims. (Cl. 116—70)

The present invention relates to an indicator device, and more particularly, to an indicator device for a filter.

In a filter system, when the filter becomes clogged, it is necessary to clean the filter element or replace it with a new one to avoid contaminants from being carried to the engine with which the filter is used through the by-pass valve which generally opens when the filter becomes clogged.

An object of the present invention is to provide a filter with a signal device to indicate when the filter has become clogged with contaminants and requires cleaning or replacement of the filter element, to avoid by-passing unfiltered oil to the engine parts.

The indicator or signal device of the present invention comprises differential pressure-sensing means in which the oil pressure on the upstream and downstream sides of the filter is transmitted against the opposite sides of a reciprocating piston. When the filter becomes clogged so that the contaminants on the upstream side thereof cause the oil pressure to increase so that the differential pressure across the filter increases, the reciprocating piston moves in a predetermined direction to actuate a signal or indicator rod to a signal position. The reciprocating piston is disposed in a bore in the filter housing and has an indicator rod attached to it which extends through the housing, so as to be exposed to the external atmosphere.

The present invention further provides a signal device which will only be actuated in accordance with the predetermined force in the spring setting used in the device no matter what the operating pressure condition of the oil flowing through the filter because there is no unbalanced force on the piston means or indicator rod when different operating conditions of oil flow therethrough. For example, whether the oil passing through the filter is 2,000 pounds per square inch pressure or under a pressure of 3,000 pounds per square inch, the piston and indicator rod will only be actuated when the differential pressure across the upstream and downstream sides of the filter exceeds the spring force of the biasing means. Hence, the signal device of the present invention will be actuated at the predetermined spring setting without requiring a change of the spring means for every change in the operating condition or pressure of the oil flowing through the filter.

One problem involved with such a device is that atmospheric pressure variations or changes outside of the housing act only against one end of the indicator rod, causing an unbalanced force to act against the sensing piston so that it will move and actuate the indicator rod at different differential pressure settings, rather than the original predetermined setting for which it is designed. Another problem encountered in such a device is that the movement of the sensing piston up and down in its bore will cause an air lock in the piston extension bore and affect operation of the device.

In accordance with the present invention, a signal device is provided which eliminates this unbalanced force acting against the indicator rod and which eliminates any air lock problem by providing means to transmit the air pressure acting against the exposed end of the indicator rod against the opposite end of the rod to balance the system and to discharge trapped air to the atmosphere.

Thus, an object of the present invention is to provide a differential pressure-sensing piston with an indicator rod extending through the filter housing and exposed to changes in atmospheric pressure, with means to balance the air pressure acting against both ends of the indicator rod so that the signal device will be actuated at a predetermined differential pressure.

The invention will be better understood from the following detailed description, when considered in connection with the accompanying drawings forming a part thereof, and in which:

FIG. 1 is an elevational view, partly in section, of the filter embodying the signal device of the present invention;

FIG. 2 is a fragmentary enlarged sectional view of the indicator device in a non-signalling position; and FIG. 3 is a view similar to FIG. 2, illustrating the indicator device in a signal position.

Referring to the drawings, the reference numeral 10 generally designates an oil filter housing having a cylindrical casing or body 11 secured to a hollow filter head 12 in a fluid-tight relationship to filter head 12 so that the filter connection 14 communicates with discharge passage 15 in the head. An oil inlet passage 16 in the head communicates with the interior of casing 11 around the filter element for flowing oil to be filtered therethrough.

An externally threaded neck or boss 19 extends above the head to define a vertical cylindrical bore 18 with the upper portion of the head. A slidable piston 20 is disposed in bore 18 and has a peripheral recess with an O-ring seal 21 in it to prevent leakage of oil by the piston. The lower end of bore 18 communicates with inlet passage 16 through a diagonal passage 23, while the upper end of the bore communicates with a drilled passage 24 extending through neck 19 and the head to outlet passage 15.

Piston 20 has an indicator rod 25 on its upper end extending above the housing and an extension 26 joined to its lower end extending into a blind bore 27 in the bottom of bore 18. A small orifice passage 28 extends through the piston, indicator rod 25 and extension 26, so that bore 27 is in communication with the external atmosphere.

A hollow internally threaded cap 29 is screwed on neck 19 and closes off the upper end of the bore 18. An O-ring seal 30 prevents any oil from leaking out of the head. The top of cap 29 is spaced from the upper end of neck 19 so that passage 24 communicates with the upper end of piston 20. The indicator rod 25 extends through a central bore 31 in the cap and has a countersink 32 in which the enlarged head 33 of the indicator rod is recessed when the signal device is in a non-signalling position. An O-ring seal 35 is seated in a recess in indicator extension 26 to prevent leakage of oil by the extension while another O-ring seal 36 is disposed in a recess in indicator rod 25 to prevent leakage of oil by the indicator rod. A large circumferential groove 37 is provided in indicator rod 25 above O-ring seal 36 to receive a ball detent 38 to lock the indicator rod in an exposed signal position once it has been actuated. A compression spring 40 in bore 18 normally urges the piston downwardly in bore 18, while a compression spring 41 normally urges ball detent 38 in a direction toward the indicator rod.

In operation, when the fitler is clean, the indicator rod is hidden within the counter bore 32 and piston 20 is disposed in its lowermost position in bore 18, as illustrated in FIG. 2. At this time, incoming oil to be filtered flows through inlet passage 16 into body 11 and through the filter element, being discharged through outlet passage 15. The oil pressure on the upstream side of the filter element is transmitted to the lower side of piston 20 through passage 23 while the oil pressure on the downstream side of the filter is transmitted through passage 24 to the upper side of piston 20.

When the filter becomes clogged with contaminants, the oil pressure on the upstream side of the filter increases, causing a greater force to act against the lower side of piston 20 increasing the differential pressure across the piston. When the differential pressure increases above a predetermined value sufficient to overcome the force in spring 40 maintaining the piston in the lower end of the bore, the piston will move upwardly. The upward movement of the piston causes the indicator rod 25 to move from its hidden position, above cap 29 to an unhidden position, thus signalling the filter element is dirty.

Since the areas on both sides of piston 20 are equal because the diameter of rod 25 and extension 26 is equal, the differential pressure-sensing piston will always be actuated at the same differential pressure value determined by spring 40, no matter what the operating condition of the oil flowing through the filter. Should the external pressure acting against the area of the upper exposed end of the indicator rod 25 vary, such pressure will be transmitted through passage 28 to the lower end of piston extension 26. This change in external pressure is balanced against the lower end of extension 26 so that the predetermined differential pressure value at which the device is designed to be actuated will never change. It will also be noted that by passage 28 extending through the indicator rod, piston, and piston extension, permits trapped air in bore 27 to be expelled therefrom when the indicator rod moves downwardly, so there will be no air lock and the indicator device will always move in response to the differential pressure across the filter.

When the indicator rod 25 moves upwardly the predetermined distance to its signalling position, the concave groove 40 moves adjacent spring ball detent 38 so that the ball detent is engaged in the groove and prevents the piston from returning to its non-signalling position until released manually.

Inasmuch as various changes may be made in the form, location and relative arrangement of the several parts without departing from the essential characteristics of the invention, it will be understood that the invention is not to be limited except by the scope of the appended claims.

What is claimed is:

1. A signal device for use with a filter and the like comprising a housing with an inlet and outlet and a piston bore therein, differential pressure piston sensing means disposed in said bore, indicator means and extension means fixedly conencted to opposite sides of said piston sensing means for movement therewith, said indicator means extending through said housing, means communicating opposite sides of said piston means and with said inlet and outlet respectively of said housing, second bore means of smaller diameter than said piston bore and forming a shoulder therewith in which said extension means are disposed, biasing means urging said piston means adjacent said shoulder when the differential pressure across said piston means and said inlet and outlet is below a predetermined value, said piston means being adapted to move said indicator means to a signal position above said housing when the differential pressure across said piston and and inlet and outlet exceeds said predetermined value, and passage means extending through said indicator means, piston means and bore means communicating with said second bore and the exterior of said housing to provide a signal device always operable at said predetermined differential value with variations in the operating pressure of liquid passed through said housing.

2. A signal device for use with a filter comprising a housing with an inlet and outlet and a bore therein, a reciprocating piston disposed in said bore, an indicator rod extending from one side of said piston and an extension member extending from the other side of said piston both fixedly connected to said piston for movement therewith, passage means communicating opposite side of said piston with the inlet and outlet respectively of said housing, said indicator rod extending through said housing, said housing having a second bore of smaller diameter adjacent said piston bore and forming a shoulder therewith with said extension member extending into said second bore means normally maintaining said piston adjacent said shoulder when the differential pressure between said inlet and outlet is below a predetermined value, said piston being adapted to move said indicator rod to a signal position above said housing when the differential pressure between said inlet and outlet and on opposite sides of said piston exceeds said predetermined value, and passage means extending completely through said indicator rod, piston and extension member and in communication at one end with the exterior of said housing and at the other end with said second bore whereby changes in external pressure is balanced against both sides of said piston so said piston will be actuated at a predetermined differential setting.

3. A signal device for use with a filter comprising a housing with an inlet and outlet and a piston bore therein, a differential pressure sensing piston in said piston bore, an indicator rod formed integral with said piston extending from one side of said piston through said housing, a cylindrical extension member formed integral with said piston and disposed thereon opposite said rod, said housing having a second bore of smaller diameter adjacent said piston bore and forming a shoulder therewith and into which said extension member extends, communicating opposite sides of said piston with said inlet and outlet respectively of said housing, biasing means normally urging said piston adjacent said shoulder when the differential pressure across said inlet and outlet is below a predetermined value, said piston being adapted to move away from said shoulder when the differential pressure across said inlet and outlet and said piston exceeds said predetermined value, and a central passage extending completely through said rod, piston and extension member and in communication at one end with the exterior of said housing and at the opposite end with said second bore to permit external air pressure to act equally against both sides of the piston and permit trapped air to be discharged from said second bore.

4. A signal device for use with a liquid filter comprising a housing with an inlet and outlet and a vertical piston bore therein, a differential pressure sensing piston in said bore, means normally maintaining said piston in the lower end of said bore, an indicator rod disposed on the top of said piston extending through said housing, an extension member disposed on the bottom of said piston, said rod and extension member fixedly connected to said piston for movement therewith, said housing having a second bore of smaller diameter adjacent the bottom of said piston and forming a shoulder therewith into which said extension member projects, passage means in communication with said vertical bore on opposite sides of said piston and with said inlet and outlet respectively of said housing biasing means urging said piston adjacent said shoulder when the differential pressure across said piston and said inlet and outlet is below a predetermined value, said piston being adapted to move said indicator rod upwardly to a signal position above said housing when the differential pressure across said piston and said inlet and outlet exceeds said predetermined value, sealing means on said rod and extension member to prevent leakage of liquid therearound and out said housing, said rod, piston and extension member having a central bore drilled therethrough and in communication at one end with the exterior of said housing and at the other end with said second bore to permit external air pressure to act on both ends of said signal device to permit said device to be actuated at a predetermined setting for different pressures of liquid flowed through the housing.

5. A signal device for use with a filter comprising a housing having an inlet and outlet and a vertical bore therein, a differential pressure sensing piston in said bore, a first passage communicating with the inlet of said housing and the lower end of said bore on one side of said piston, a second passage communicating with the outlet of said housing and the upper end of said bore on the other side of said piston, a cylindrical indicator rod disposed on the top of said piston extending through said housing and fixedly connected to said piston for movement therewith, biasing means normally urging said piston against the lower end of the bore when the differential pressure across said inlet and outlet and said piston is below a predetermined value, said rod being adapted to move out of said housing when the differential pressure across said inlet and outlet and said piston exceeds said predetermined value, a cylindrical extension member extending below said piston fixedly connected to said piston for movement therewith, said rod and extension member being of equal diameter, said member extending into a blind bore, said blind bore being of smaller diameter than said piston bore and forming a shoulder therebetween, sealing means around said rod and extension member, an air passage extending completely through said rod, piston and extension member whereby external air pressure acts equally against both sides of said piston and permits trapped air in the blind bore to escape.

6. A signal device for use with a liquid filter comprising a housing having an inlet and outlet and a vertical bore therein, a differential pressure sensing piston in said bore, a first passage communicating with the inlet of said housing and the lower end of said bore on one side of said piston, a second passage communicating with the outlet of said housing and the upper end of said bore on the other side of said piston, a cylindrical indicator rod disposed on the top of said piston extending through said housing fixedly connected to said piston for movement therewith, biasing means normally urging said piston against the lower end of the bore when the differential pressure across said piston and said inlet and outlet is below a predetermined value, said rod adapted to move out of said housing to a signal position when the differential pressure across said piston and said inlet and outlet exceeds a predetermined value, a cylindrical extension member extending below said piston fixedly connected to said piston for movement therewith, said rod and extension members being of equal diameter and of smaller diameter than said piston, said member extending into a blind bore adjacent the bottom of said piston bore and forming a shoulder therewith, sealing means around said rod and extension member, locking means for securing said indicator rod in a signal position, and an air passage extending completely through said rod, piston and extension member and in communication with said blind bore at one end and the exterior of the housing at the other end, whereby external air pressure acts equally against both ends of said signal device and permits trapped air in the blind bore to escape.

References Cited in the file of this patent

UNITED STATES PATENTS

| | | |
|---|---|---|
| 2,472,717 | Morey | June 7, 1949 |
| 2,697,999 | Crookston et al. | Dec. 28, 1954 |
| 2,709,983 | Divietro | June 7, 1955 |
| 2,878,936 | Scavuzzo et al. | Mar. 24, 1959 |
| 2,935,040 | Steensen | May 3, 1960 |
| 2,979,021 | Scavuzzo | Apr. 11, 1961 |

FOREIGN PATENTS

| | | |
|---|---|---|
| 296,973 | Switzerland | May 17, 1954 |